(12) United States Patent
Uchida et al.

(10) Patent No.: US 11,340,782 B2
(45) Date of Patent: May 24, 2022

(54) CONTROL DEVICE AND CONTROL METHOD

(71) Applicant: FANUC CORPORATION, Yamanashi (JP)

(72) Inventors: Satoshi Uchida, Yamanashi (JP); Shinichirou Itakura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 101 days.

(21) Appl. No.: 16/925,849

(22) Filed: Jul. 10, 2020

(65) Prior Publication Data

US 2021/0064232 A1   Mar. 4, 2021

(30) Foreign Application Priority Data

Aug. 27, 2019   (JP) .............................. JP2019-154554

(51) Int. Cl.
*G06F 3/04886*   (2022.01)

(52) U.S. Cl.
CPC ................................ *G06F 3/04886* (2013.01)

(58) Field of Classification Search
CPC ............................. G06F 3/04886; G06F 3/048
See application file for complete search history.

(56) References Cited

U.S. PATENT DOCUMENTS

| | | | | |
|---|---|---|---|---|
| 2004/0135808 | A1* | 7/2004 | Sagara | G05B 19/409 715/762 |
| 2009/0212980 | A1* | 8/2009 | Hisada | G06F 3/04886 341/28 |
| 2012/0019861 | A1* | 1/2012 | Okada | G06K 15/4075 358/1.15 |
| 2014/0371883 | A1* | 12/2014 | Shah | G06F 1/206 700/90 |
| 2015/0331572 | A1* | 11/2015 | Mischke | G06F 3/0482 715/769 |
| 2017/0031345 | A1* | 2/2017 | Ono | G05B 19/409 |

FOREIGN PATENT DOCUMENTS

JP   2004-206550   7/2004

* cited by examiner

*Primary Examiner* — Jeanette J Parker
(74) *Attorney, Agent, or Firm* — Wenderoth, Lind & Ponack, L.L.P.

(57) ABSTRACT

A control device controls display of a display device for displaying a display screen for setting operations of the control device that controls an industrial machine and soft keys for operating the display screen. The control device includes: a key input processing unit that receives input from an input device; an input content determining unit that determines a content of the input received by the key input processing unit; a storage unit that stores a soft key definition information table in which operation contents on the display screen to be allocated to the soft keys are defined in advance; a soft key allocation selecting unit that selects the operation contents to be allocated to the soft keys; and a soft key display processing unit that displays the soft keys allocated with the operation contents selected by the soft key allocation selecting unit on the display device.

6 Claims, 9 Drawing Sheets

CONTROL DEVICE AND CONTROL METHOD

This application is based on and claims the benefit of priority from Japanese Patent Application No. 2019-154554, filed on 27 Aug. 2019, the content of which is incorporated herein by reference.

BACKGROUND OF THE INVENTION

Field of the Invention

The present invention relates to a control device and a control method.

Related Art

It is known that a key input display portion for displaying a value input from a keyboard and a soft key which is an input device realized in software are displayed on a display screen for setting operations of a control device that controls an industrial machine. For example, see Patent Document 1.

FIG. 8 is a diagram illustrating an example of a display screen 10.

A display screen 10 of FIG. 8 illustrates a tool offset screen for setting an offset of a tool. The display screen 10 includes a region (hereinafter also referred to as a "setting display region 20") for displaying cells storing setting values of offsets ("shape" and "wear" of "length" and "radius") of sixteen tools of the numbers "001" to "016", for example. The display screen 10 further includes a region (hereinafter also referred to as a "key input display portion display region 30") for displaying a key input display portion 31 for displaying the input setting values and a region (hereinafter also referred to as a "soft key display region 40") for displaying soft keys 41(1) to 41(n). n is a positive integer.

Hereinafter, although a case where n=10 is described, the same operation is applied to a case where n is a plural number other than 10. When it is not necessary to distinguish the individual soft keys 41(1) to 41(10), these soft keys will be collectively referred to as a "soft key 41".

A user performs a screen transitioning operation and operations on a screen by touching the display screen 10 via a touch panel or the like disposed in a display device to select the soft key 41. For example, the soft key 41(6) for "offset" is pressed on the display screen 10 of FIG. 8 to display a tool offset screen.

On the display screen 10 of FIG. 8, the user selects a cell for setting "wear" of "length" of the tool of the number "001" indicated by a shaded rectangle by touching the display screen 10. In this case, the user inputs a value to be set in the key input display portion 31 whereby the input value is set in the selected cell as a setting value. The necessity of the key input display portion 31 is as follows: (1) by inputting a value in the key input display portion 31 once rather than directly inputting the same, the "set value" and the "input value" can be compared, (2) the operability is unified in such a manner that a value is input to the key input display portion 31 and then an input key or a search key is pressed, and (3) a search operation can be performed with a few steps.

Patent Document 1: Japanese Unexamined Patent Application, Publication No. 2004-206550

SUMMARY OF THE INVENTION

However, there is a limit on the number of soft keys 41 that can be displayed on one display screen 10. Therefore, it is difficult to display all soft keys 41 if the number of screen transitions and the operations on the screen increases. Therefore, as illustrated in FIG. 9, a method of layering the soft key display region 40 for displaying the soft keys 41 or displaying the same in a page form to arrange all soft keys 41 may be used.

In FIG. 9, for example, the soft keys 41(1) to 41(10) are soft keys displayed in the soft key display region 40 on the first layer. Soft keys 42(1) to 42(10) are soft keys displayed in the soft key display region 40 on the second layer. Soft keys 43(1) to 43(10) are soft keys displayed in the soft key display region 40 on the third layer.

For example, when a user presses a soft key 41 allocated to an arrow key (a horizontal key) or the like among the soft keys 41 on the display screen 10, the soft keys 42(1) to 42(10) on the second layer are displayed in the soft key display region 40 of the display screen 10 as the soft keys 41(1) to 41(10). When the user presses a soft key 41 allocated to an arrow key or the like among the soft keys 41 (that is, 42(1) to 42(10)) on the display screen 10, the soft keys 43(1) to 43(10) on the third layer are displayed in the soft key display region 40 of the display screen 10 as the soft keys 41(1) to 41(10).

However, in this method, the user needs to find a soft key for performing a desired operation, which is troublesome.

Since soft keys 41 which are not related to the input to the key input display portion 31 are also displayed, it may be difficult for the user to perform operations immediately.

Therefore, it is desirable to display only a soft key 41 corresponding to a necessary operation depending on the content input to the key input display portion 31.

(1) An aspect of a control device of the present disclosure is a control device that controls display of a display device for displaying a display screen for setting operations of the control device that controls an industrial machine and soft keys for operating the display screen, including: a key input processing unit that receives input from an input device; an input content determining unit that determines a content of the input received by the key input processing unit; a storage unit that stores a soft key definition information table in which operation contents on the display screen to be allocated to the soft keys are defined in advance depending on the input content; a soft key allocation selecting unit that selects the operation contents to be allocated to the soft keys on the basis of a determination result of the input content determining unit and the soft key definition information table; and a soft key display processing unit that displays the soft keys allocated with the operation contents selected by the soft key allocation selecting unit on the display device.

(2) An aspect of a control method of the present disclosure is a control method for controlling display of a display device that displays a display screen for setting operations of a control device that controls an industrial machine and soft keys for operating the display screen, the method being realized by a computer and including: a key input processing step of receiving input from an input device; an input content determining step of determining a content of the input received in the key input processing step; a soft key allocation selecting step of selecting operation contents to be allocated to the soft keys on the basis of a determination result in the input content determining step and a soft key definition information table in which the operation contents on the display screen to be allocated to the soft keys are defined in advance depending on the input content; and a soft key display processing step of displaying the soft keys allocated with the operation contents selected in the soft key allocation selecting step on the display device.

According to an aspect, it is possible to display only a soft key corresponding to a necessary operation depending on the content input to a key input display portion.

BRIEF DESCRIPTION OF THE DRAWINGS

FIG. 7 is a diagram illustrating an example of a display device that does not have a mouse, a touch panel, and the like.

DETAILED DESCRIPTION OF THE INVENTION

Hereinafter, a first embodiment of the present disclosure will be described with reference to the drawings.

First Embodiment

Figure 1:
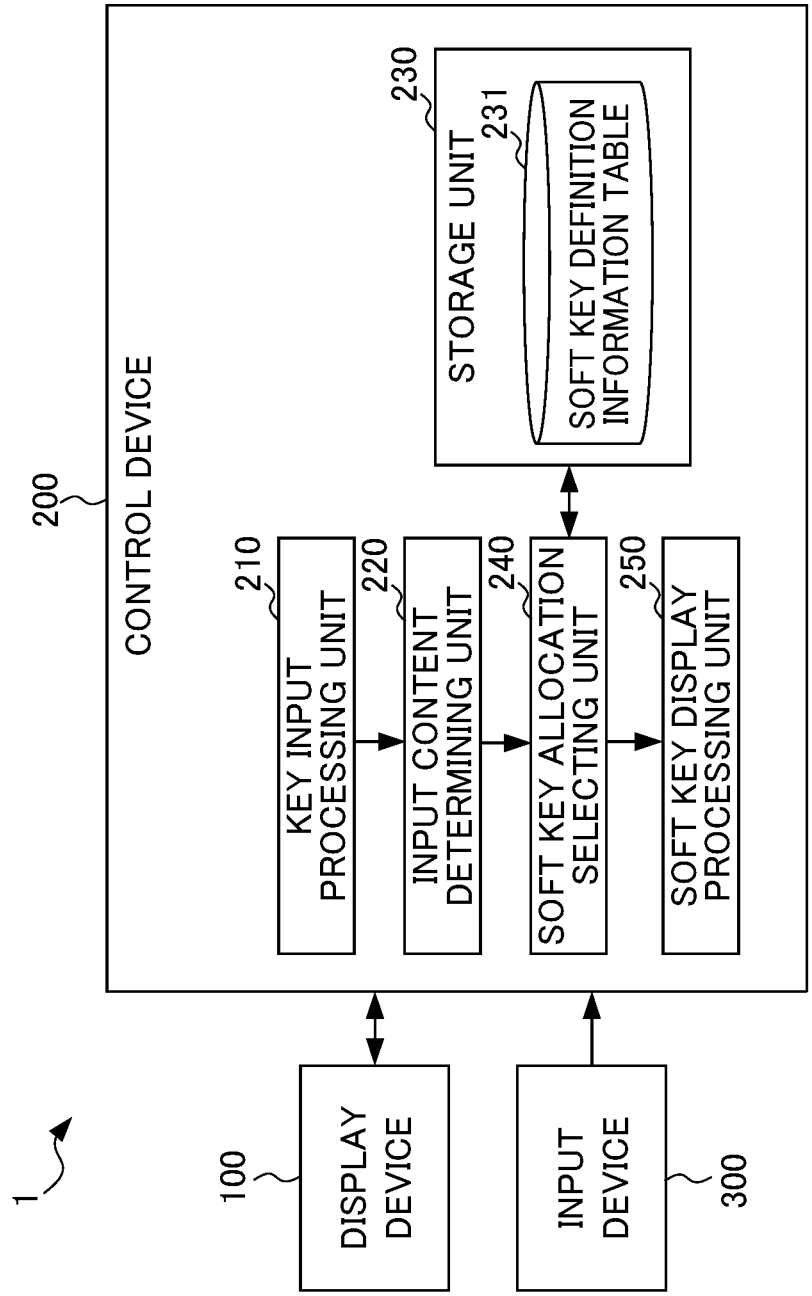
FIG. 1 is a functional block diagram illustrating a functional configuration example of a control system according to a first embodiment.

FIG. 1 is a functional block diagram illustrating a functional configuration example of a control system 1 according to a first embodiment.

As illustrated in FIG. 1, the control system 1 includes a display 100, a control device 200, and an input device 300.

The display device 100, the control device 200, and the input device 300 may be connected directly to each other via a connection interface (not illustrated). The display device 100, the control device 200, and the input device 300 may be connected to each other via a network (not illustrated) such as a local area network (LAN) or the Internet. In this case, the display device 100, the control device 200, and the input device 300 have a communication unit (not illustrated) for performing communication each other using the connection. The display device 100 and the input device 300 may be included in the control device 200.

The display device 100 has a display unit (not illustrated) such as a liquid crystal display and a touch panel (not illustrated) disposed on a front surface of the display unit (not illustrated). The display device 100 displays a display screen 10 for setting operations of the control device 200 on the display unit (not illustrated). The display device 100 receives operations on the display screen 10 by a user via the touch panel (not illustrated).

The input device 300 is a keyboard, a manual data input (MDI), a touch panel, or the like and receives input from a user and outputs the user's input to the control device 200.
<Control Device 200>

The control device 200 is a numerical controller that is well known to those skilled in the art, and generates an operation command on the basis of control information and transmits the generated operation command to a machine tool (not illustrated). In this way, the control device 200 controls operations of the machine tool (not illustrated). When the machine tool is a robot, the control device 200 may be a robot controller or the like.

A control target of the control device 200 is not limited to a machine tool and a robot, but the control device 200 may be broadly applied to all industrial machines. An industrial machine includes various machines such as a machine tool, an industrial robot, a service robot, a forging machine, and an injection molding machine.

As illustrated in FIG. 1, the control device 200 controls the display of the display device 100 for displaying soft keys 41. Therefore, the control device 200 includes a key input processing unit 210, an input content determining unit 220, a storage unit 230, a soft key allocation selecting unit 240, and a soft key display processing unit 250.

The control device 200 includes an arithmetic processing unit (not illustrated) such as a central processing unit (CPU) in order to realize the operations of the functional blocks in FIG. 1, for example. The control device 200 includes an auxiliary storage device (not illustrated) such as a read only memory (ROM) and a hard disk drive (HDD) storing various control programs and a main storage device (not illustrated) such as a random access memory (RAM) for storing data which is temporarily necessary for an arithmetic processing device to execute programs.

In the control device 200, the arithmetic processing device reads application software and an OS from the auxiliary storage device and performs an arithmetic process based on the application software and the OS while deploying the read application software and OS on the main storage device. The control device 200 controls various hardware components on the basis of the arithmetic processing result. In this way, the processes of the functional blocks in FIG. 1 are realized. That is, the control device 200 can be realized by cooperation of hardware and software.

The key input processing unit 210 receives input from the input device 300.

Specifically, the key input processing unit 210 receives data input by the user via the input device 300. The key input processing unit 210 may display the input data on the key input display portion 31.

The input content determining unit 220 determines the content of the input received by the key input processing unit 210.

Specifically, the input content determining unit 220 determines whether the input content is a number, a character string, or a combination thereof, for example. The input content determining unit 220 may determine whether any input has been received via the key input processing unit 210.

The storage unit 230 is a ROM, a HDD, or the like and stores various programs executed by the control device 200 and stores a soft key definition information table 231.

The soft key definition information table 231 is a table in which operation contents to be allocated to the soft keys 41 depending on the input content are defined in advance.

Specifically, the soft key definition information table 231 may be defined such that when the input content is a number, for example, operation contents such as "input" and "search" are allocated to soft keys 41(1), 41(2), and the like, respectively. The soft key definition information table 231 may be defined such that when an input content is a character string, operation contents such as "input", "search", "file input", and the like are allocated to soft keys 41(1), 41(2), 41(3), and the like, respectively. The soft key definition information table 231 may be defined such that when there is no input, operation contents such as "screen transition" are allocated to the soft key 41(1) and the like.

The soft key definition information table 231 may be defined such that operation contents such as "input" are allocated to the soft key 41(1) and the like depending on an operation target item on the display screen 10 such as a tool offset screen, for example.

The soft key allocation selecting unit 240 selects operation contents to be allocated to the soft keys 41 on the basis of the determination result of the input content determining unit 220 and the soft key definition information table 231.

Specifically, when the input content determining unit 220 determines that the input content is a number, the soft key allocation selecting unit 240 selects "input", "search", and the like as the operation contents to be allocated to the soft keys 41(1), 41(2), and the like on the basis of the soft key definition information table 231. When the input content determining unit 220 determines that the input content is a character string, the soft key allocation selecting unit 240 selects "input", "search", "file input", and the like as the operation contents to be allocated to the soft keys 41(1), 41(2), 41(3), and the like on the basis of the soft key definition information table 231. When the input content determining unit 220 determines that nothing is input, the soft key allocation selecting unit 240 may select screen transition and the like as the operation contents to be allocated to the soft keys 41(1) and the like on the basis of the soft key definition information table 231.

The soft key display processing unit 250 displays the soft key 41 allocated with the operation content selected by the soft key allocation selecting unit 240 in the soft key display region 40.

Figure 2:
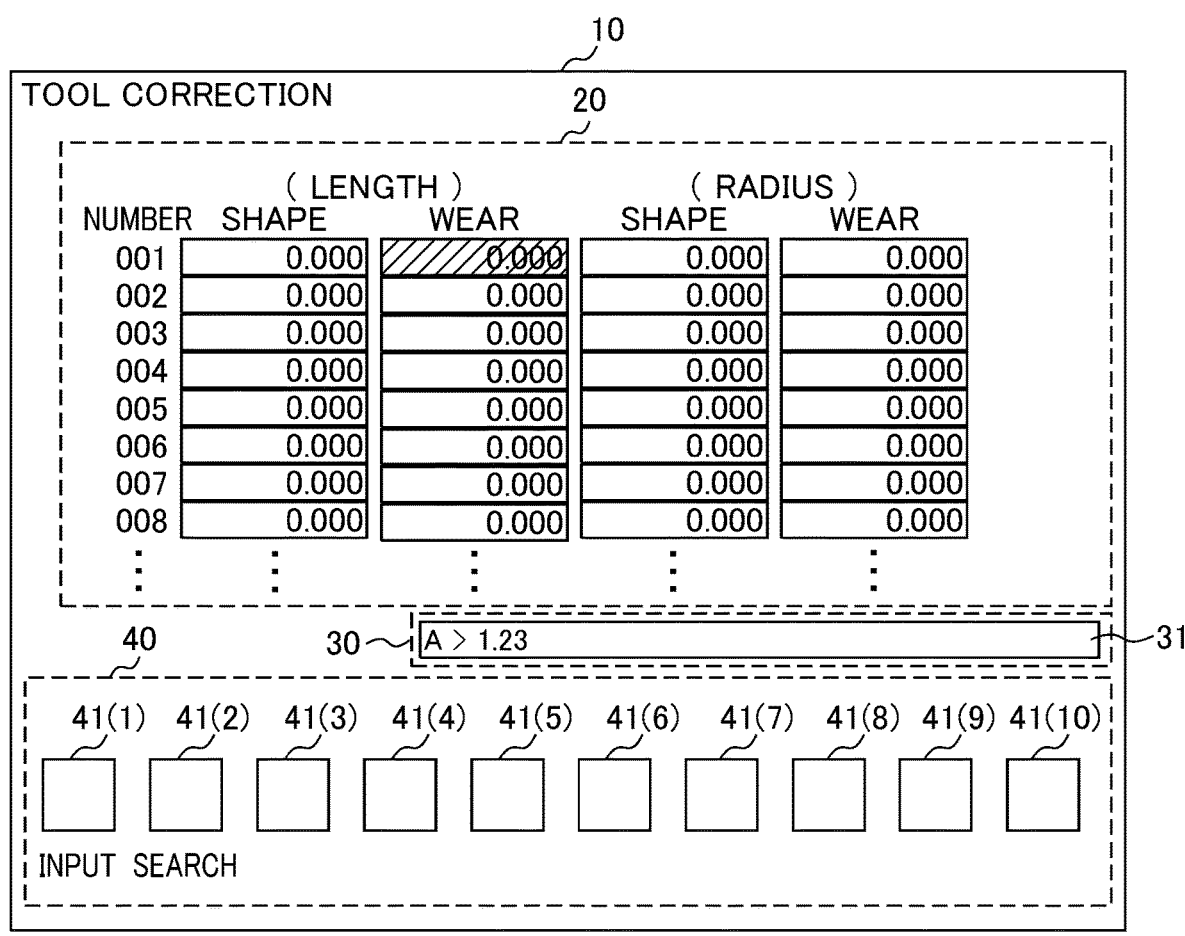
FIG. 2 is a diagram illustrating an example of a display screen.

FIG. 2 is a diagram illustrating an example of the display screen 10.

Figure 8:
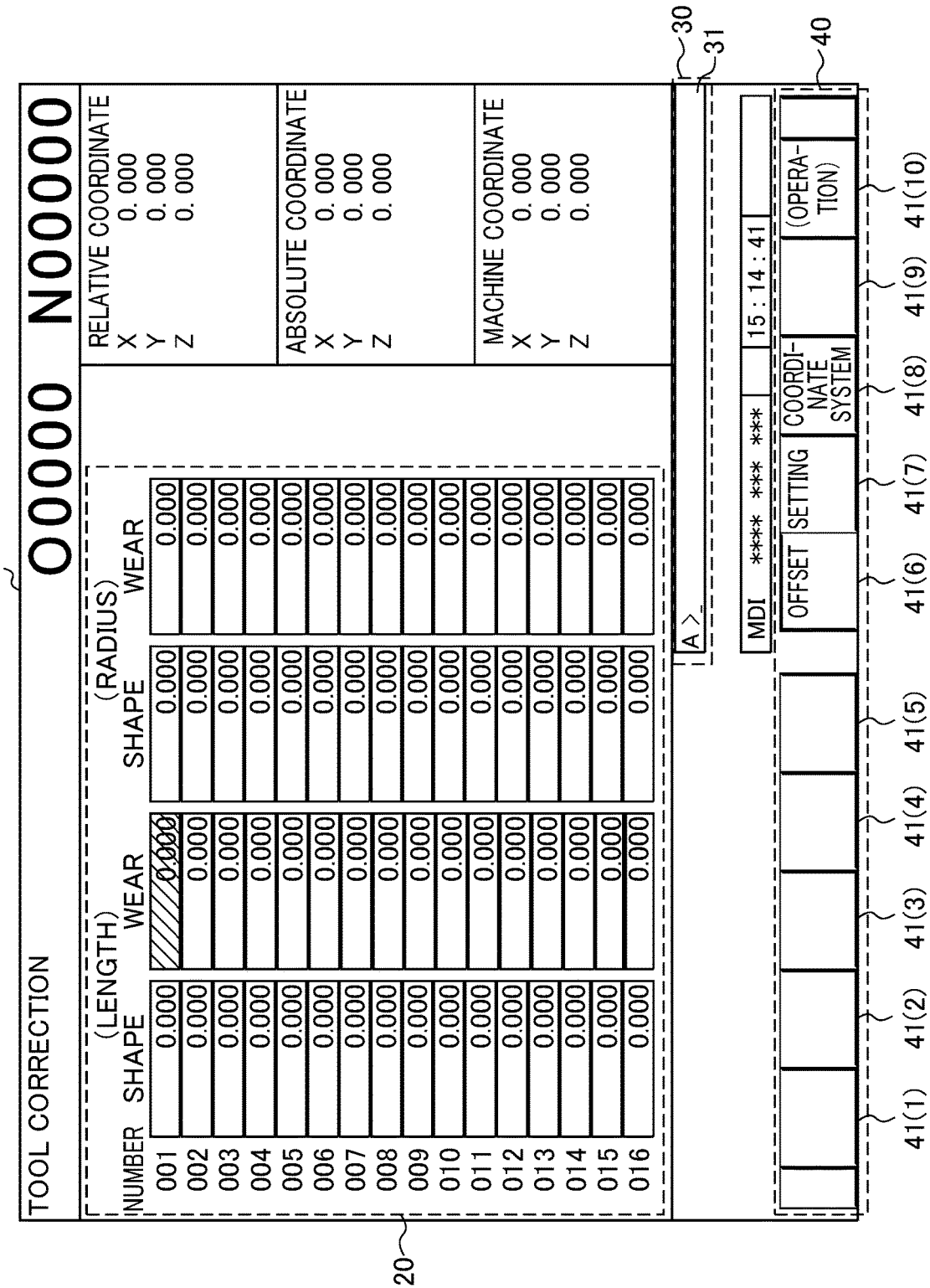
FIG. 8 is a diagram illustrating an example of a display screen.
Figure 9:
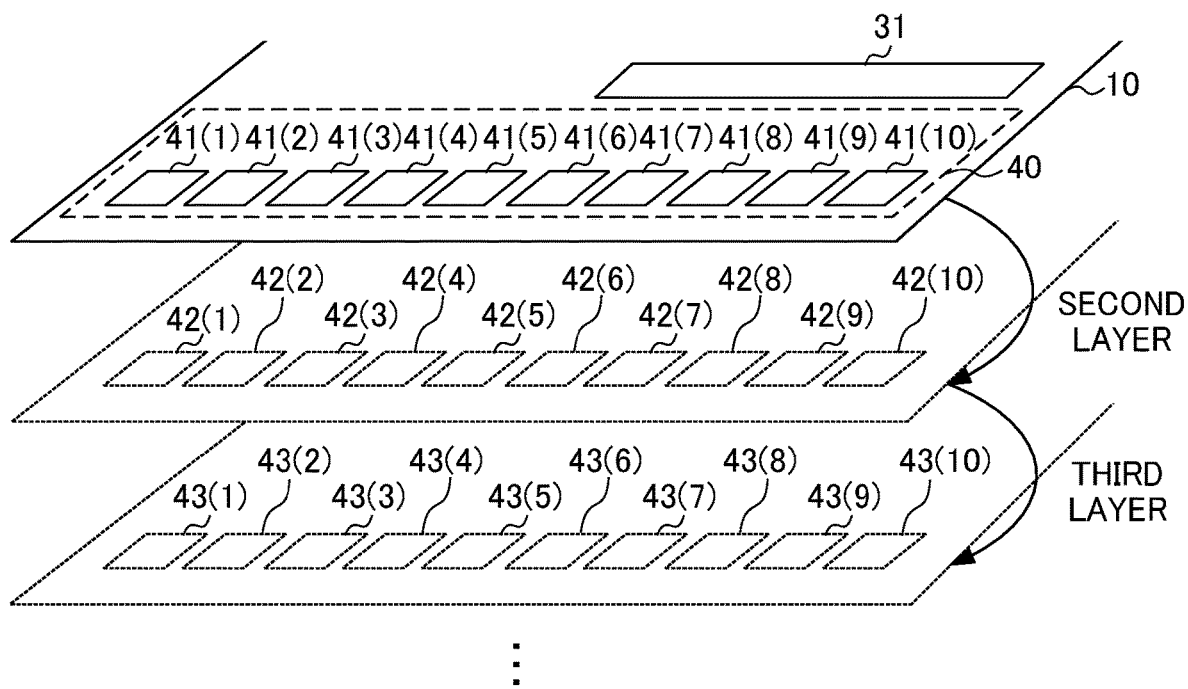
FIG. 9 is a diagram illustrating an example of display of layered soft keys.

As illustrated in FIG. 2, the display screen 10 illustrates the same tool offset screen as that of FIG. 8 and displays cells storing the setting values of the offsets of tools from the number "001" in the setting display region 20 and displays the key input display portion 31 and the soft key 41 in the key input display portion display region 30 and the soft key display region 40, respectively. In FIG. 2, some cells among the cells storing the setting values of the offsets of the tools from the number "001" are illustrated.

For example, when a user touches the display screen 10 via a touch panel (not illustrated) of the display device 100 to select a cell indicated by a shaded rectangle and inputs a number "1.23" in the key input display portion 31 via the input device 300, the input content determining unit 220 determines that the input content is a number. The soft key allocation selecting unit 240 selects "input" and "search" as the operation contents to be allocated to the soft key 41, for example, on the basis of the determination result of the input content determining unit 220 and the soft key definition information table 231. The soft key display processing unit 250 displays the soft keys 41(1) and 41(2) allocated with the operation contents "input" and "search" selected by the soft key allocation selecting unit 240 in the soft key display region 40 together with the operation contents.

The soft key display processing unit 250 may display the soft keys 41(3) to 41(10) not to be allocated with the operation contents in the soft key display region 40 with the operation content left blank.

When the user presses the soft key 41(1) of "input" via a touch panel (not illustrated), the number "1.23" input in the key input display portion 31 is set in the selected cell. On the other hand, when the user presses the soft key 41(2) of "search", for example, the control device 200 searches for cells in which the number "1.23" is set.

In this manner, the control device 200 determines the operation contents to be allocated to the soft keys 41 on the basis of the input content and the soft key definition information table 231 and displays the soft keys 41 allocated with the operation contents on the display device 100. In this way, since the soft keys 41 for the necessary operations corresponding to the input content are displayed on the display device 100, the user can reduce the burden of finding a desired soft key 41, perform operations immediately, and prevent operation errors.

<Display Process of Control Device 200>

Next, an operation related to a display process of the control device 200 according to the first embodiment will be described.

Figure 3:
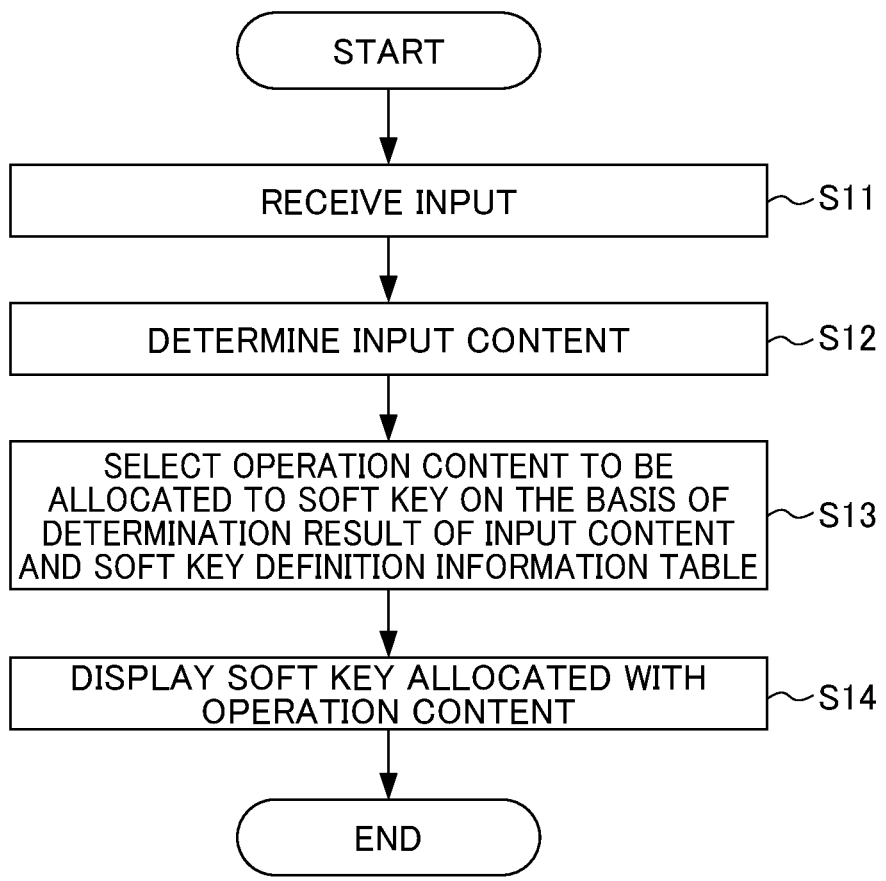
FIG. 3 is a flowchart illustrating a display process of a control device.

FIG. 3 is a flowchart illustrating a display process of the control device 200. The flow illustrated therein is executed whenever user's input is received.

In step S11, the key input processing unit 210 receives user's input via the input device 300.

In step S12, the input content determining unit 220 determines the content of the input received in step S11.

In step S13, the soft key allocation selecting unit 240 selects an operation content to be allocated to the soft key 41 on the basis of the determination result of the input content determined in step S12 and the soft key definition information table 231.

In step S14, the soft key display processing unit 250 displays the soft key 41 allocated with the operation content selected in step S13 in the soft key display region 40.

In this way, the control device 200 according to the first embodiment determines the content of the user's input in the key input display portion 31 from the display device 100 and determines the operation contents to be allocated to the soft keys 41 on the basis of the determination result of the input content and the soft key definition information table 231. The control device 200 displays the soft keys 41 allocated with the operation contents in the soft key display region 40. In this way, the soft keys 41 of the necessary operations corresponding to the input content are displayed on the display device 100. The user can reduce the burden of finding a desired soft key 41, perform operations immediately, and prevent operation errors.

The first embodiment has been described hereinabove.

Second Embodiment

Next, a second embodiment will be described. In the second embodiment, a control device 200A further include a function of determining an operation target of the display screen 10 on the basis of an input item on the display screen 10 and a function of determining the suitability of the input content on the basis of the determination result of the operation target in addition to the functions of the first embodiment.

In this way, when the input content is suitable for the operation target of the display screen 10, the control device 200A of the second embodiment displays the soft key 41 allocated with the operation content on the display device 100. On the other hand, when the input content is not suitable for the operation target, the control device 200A does not display or grays out the soft key 41 allocated with the operation content.

In this way, in the control device 200A, only the soft key 41 of a necessary operation is displayed depending on the operation target and the input content on the display screen 10, and the user can reduce the burden of finding a desired soft key 41, perform operations immediately, and prevent operation errors.

Hereinafter, the second embodiment will be described.

Figure 4:
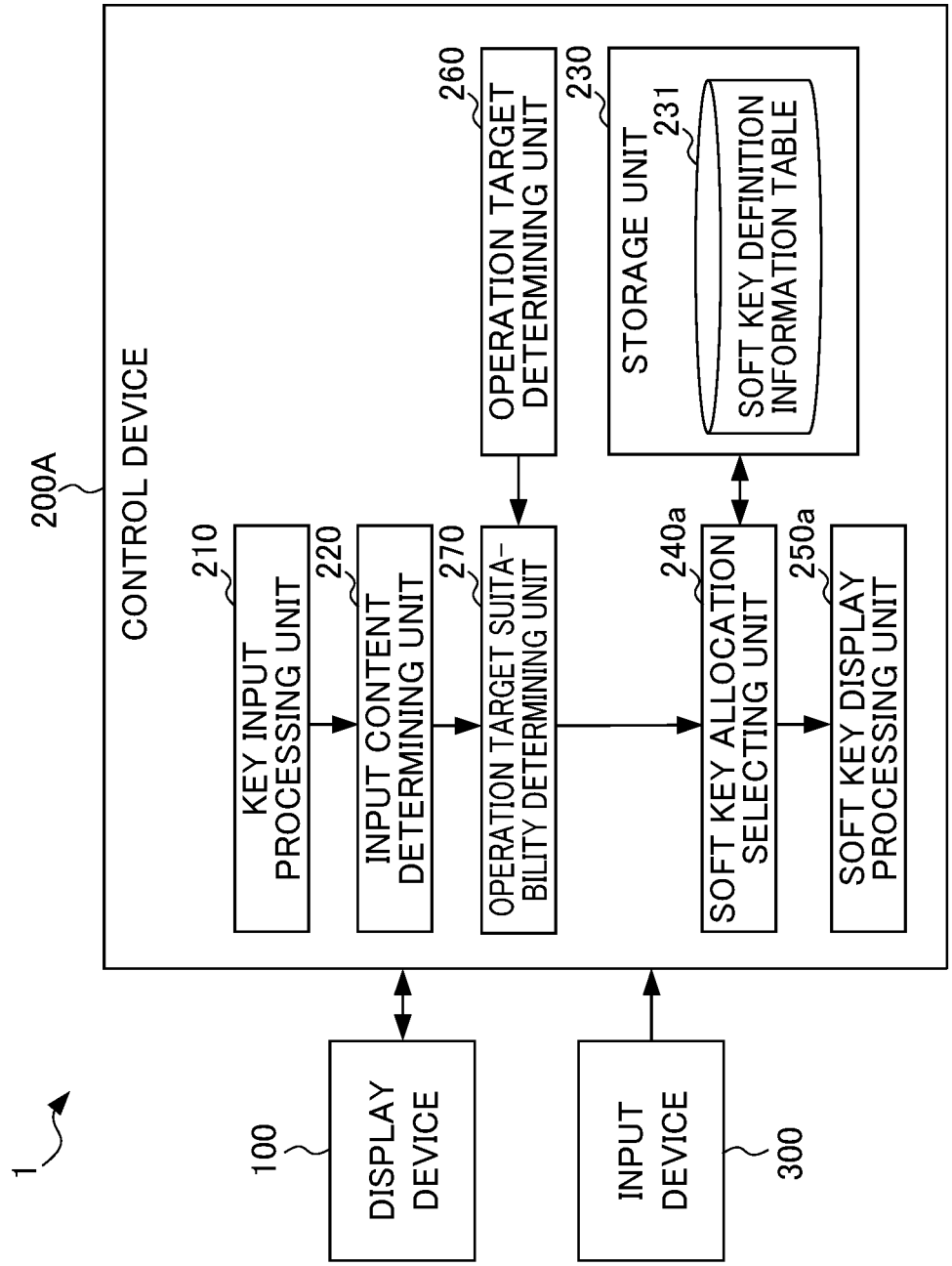
FIG. 4 is a functional block diagram illustrating a functional configuration example of a control system according to a second embodiment.

FIG. 4 is a functional block diagram illustrating a functional configuration example of the control system 1 according to the second embodiment. Elements having the same functions as the elements of the control system 1 of FIG. 1 will be denoted by the same numerals and the detailed description thereof will be omitted.

The control device 200A according to the second embodiment includes a key input processing unit 210, an input content determining unit 220, a storage unit 230, a soft key allocation selecting unit 240a, a soft key display processing unit 250a, an operation target determining unit 260, and an operation target suitability determining unit 270.

The key input processing unit 210, the input content determining unit 220, and the storage unit 230 have functions equivalent to those of the key input processing unit 210, the input content determining unit 220, and the storage unit 230 of the first embodiment.

The operation target determining unit 260 determines an operation target of the display screen 10 on the basis of an input item on the display screen 10.

Figure 5:
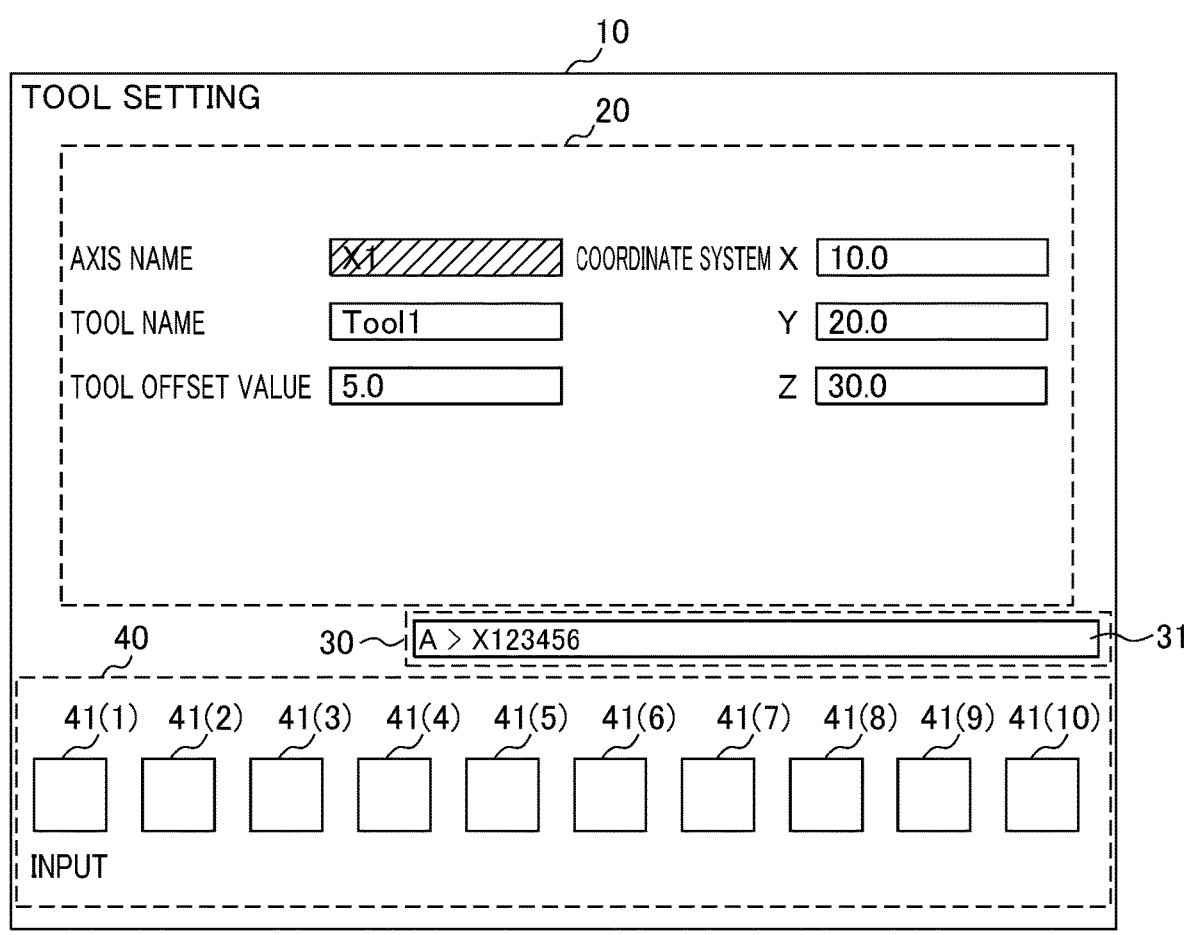
FIG. 5 is a diagram illustrating an example of a display screen.

FIG. 5 is a diagram illustrating an example of the display screen 10.

The display screen 10 of FIG. 5 illustrates a tool setting screen, and displays cells for setting "axis name", "tool name", "tool offset value", "coordinate system X", "coordinate system Y", and "coordinate system Z" in a setting display region 20. The display screen 10 displays a key input display portion 31 in a key input display portion display region 30 and displays soft keys 41 in a soft key display region 40. For example, in the display screen 10 of FIG. 5, a cell of an input item of "axis name" indicated by a shaded rectangle is selected by a user's operation via a touch panel (not illustrated).

In this case, the operation target determining unit 260 determines that the operation target of the display screen 10 is the item of "axis name" on the basis of the selected cell (input item).

The operation target suitability determining unit 270 determines the suitability of the input content on the basis of the determination result of the operation target determining unit 260.

Specifically, as illustrated in FIG. 5, when the operation target is the item of "axis name", the operation target suitability determining unit 270 determines whether the content "X123456" input to the key input display portion 31 is the name of an axis that is not present, the content has more than a threshold number of characters, or an unusable character is used.

Data for determining whether the input content is the name of an axis that is not present, the content has more than a threshold number of characters, and an unusable character is used may be stored in advance in the storage unit 230 for respective operation target items.

When the operation target is the item of "tool name", the operation target suitability determining unit 270 determines the suitability of the input content similarly to the case of "axis name".

When the operation target is the item of "tool offset value", the operation target suitability determining unit 270 may determine whether the content input to the key input display portion 31 is an out-of-range value and a character other than numbers is used.

When the operation target is the items of "coordinate system X", "coordinate system Y", and "coordinate system Z", the operation target suitability determining unit 270 may determine whether the content input to the key input display portion 31 is a value outside an operating range of a machine tool (not illustrated) controlled by the control device 200 and a character other than numbers is used.

When the input content is not suitable, the operation target suitability determining unit 270 may display an alert on the display device 100 to prompt the user for suitable input.

The soft key allocation selecting unit 240a selects operation contents to be allocated to the soft keys 41 on the basis of the determination result of the operation target suitability determining unit 270 and the soft key definition information table 231.

Specifically, when the operation target suitability determining unit 270 determines that the input content is suitable, the soft key allocation selecting unit 240a selects operation contents such as "input" to be allocated to the soft keys 41 on the basis of the soft key definition information table 231. The soft key allocation selecting unit 240a causes the soft key display processing unit 250a to display the soft keys 41 allocated with the selected operation contents in the soft key display region 40.

On the other hand, when the operation target suitability determining unit 270 determines that the input content is not suitable, the soft key allocation selecting unit 240a causes the soft key display processing unit 250a not to display or gray out the soft keys 41 allocated with the selected operation contents.

The soft key display processing unit 250a displays or does not display or gray outs the soft keys 41 allocated with the operation contents selected by the soft key allocation selecting unit 240a in the soft key display region 40 according to an instruction from the soft key allocation selecting unit 240a.

For example, in the display screen 10 of FIG. 5, when the input content "X123456" input to the key input display portion 31 with regard to the operation target item of "axis name" has more than a threshold number of characters, the operation target suitability determining unit 270 determines that the input content is not suitable. In this case, the soft key allocation selecting unit 240a causes the soft key display processing unit 250a to gray out the soft key 41(1) allocated with the selected operation content of "input".

<Display Process of Control Device 200A>

Next, an operation related to a display process of the control device 200A according to the second embodiment will be described.

Figure 6:
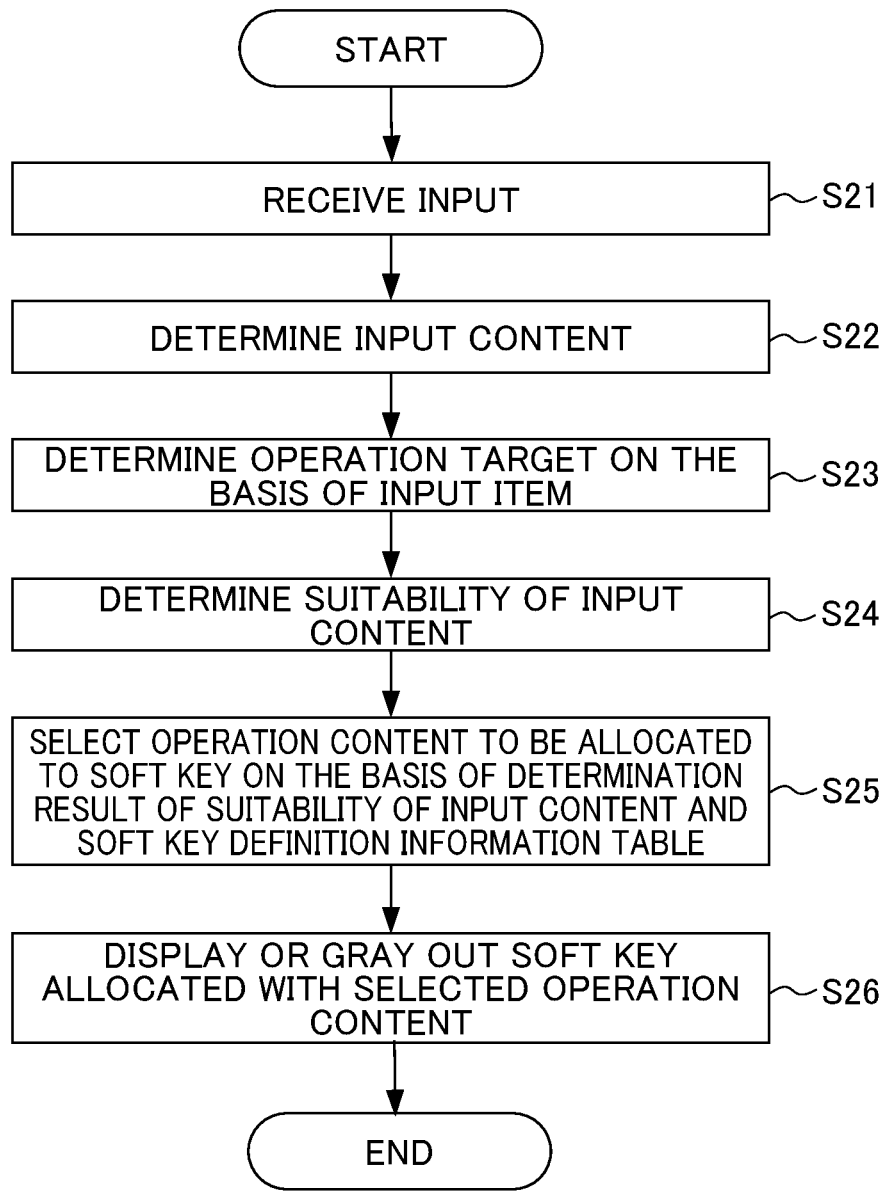
FIG. 6 is a flowchart illustrating a display process of a control device.

FIG. 6 is a flowchart illustrating the display process of the control device 200A. The flow illustrated herein is executed whenever user's input is received.

In the display process illustrated in FIG. 6, the processes of steps S21 and S22 are the same as those of steps S1 and S12 of the first embodiment in FIG. 3, and the description thereof will be omitted.

In step S23, the operation target determining unit 260 determines an operation target of the display screen 10 on the basis of the input item on the display screen 10.

In step S24, the operation target suitability determining unit 270 determines the suitability of the input content on the basis of the determination result in step S23.

In step S25, the soft key allocation selecting unit 240a selects operation contents to be allocated to the soft keys 41 on the basis of the determination result in step S24 and the soft key definition information table 231.

In step S26, the soft key display processing unit 250a displays or grays out the soft keys 41 allocated with the operation contents selected in step S25 in the soft key display region 40 according to an instruction from the soft key allocation selecting unit 240a.

In this way, the control device 200A according to the second embodiment determines an operation target on the basis of the input item and determines the suitability of the input content input to the key input display portion 31 by the user on the basis of the determined operation target. The control device 200A displays or does not display or grays out the soft keys 41 allocated with the operation contents in the soft key display region 40 on the basis of the suitability determination of the input content. In this way, only the soft keys 41 of necessary operations are displayed on the display device 100 depending on the content of the user's input and the operation target. The user can reduce the burden of finding a desired soft key 41, perform operations immediately, and prevent operation errors.

The second embodiment has been described hereinabove.

Modification 1 of Second Embodiment

In the second embodiment, although the items of "axis name", "tool name", "tool offset value", "coordinate system X", "coordinate system Y", and "coordinate system Z" are used as the operation target, there is no limitation thereto. For example, the operation target may include an item in which a setting value is input in bit units. In this case, the operation target suitability determining unit 270 may determine whether a number other than "0" and "1" is input. The soft key allocation selecting unit 240a may cause the soft key display processing unit 250a to display or do not display or gray out the soft keys 41 allocated with the selected operation contents in the soft key display region 40 according to the determination result of the operation target suitability determining unit 270.

The operation target may include an item of inputting a file such as a machining program and an item of saving a file such as a created machining program. For example, when the operation target is an item of inputting a file, the operation target suitability determining unit 270 may determine whether a file name of a machining program or the like corresponding to an input content is present in the storage unit 230. When the operation target suitability determining unit 270 determines that the corresponding file name is not present, the soft key allocation selecting unit 240a may cause the soft key display processing unit 250a not to display or gray out the soft keys 41 allocated with the selected operation contents such as "file input".

For example, when the operation target is an item of saving a file, and the input content is a character string, the operation target suitability determining unit 270 may determine whether the character string meets the requirements of file names (for example, only alphabet and underscores should be used). When the operation target suitability determining unit 270 determines that the input content does not meet the requirements of file names, the soft key allocation selecting unit 240a may cause the soft key display processing unit 250a not to display or gray out the soft keys 41 allocated with the selected operation contents such as "file creation".

Modification 2 of Second Embodiment

For example, in the second embodiment, although the operation target suitability determining unit 270 determines only the suitability of the input content, when it is determined that the input content is not suitable, an alert may be displayed on the display device 100 with a reason why the input content is not suitable to prompt the user for re-input. By doing so, the user can input a correct content.

While the first and second embodiments have been described, the control devices 200 and 200A are not limited to the above-described embodiments but may include modifications and improvements within a range where the object can be attained.

Modification 1

In the first and second embodiments, although the soft key 41 is pressed by the user via a touch panel (not illustrated) of the display device 100, there is no limitation thereto. For example, some control devices 200 and 200A are used for a long period (for example, 10 years or more) once they are introduced. Therefore, some control devices that are currently operating have a display device that does not have a touch panel.

Figure 7:
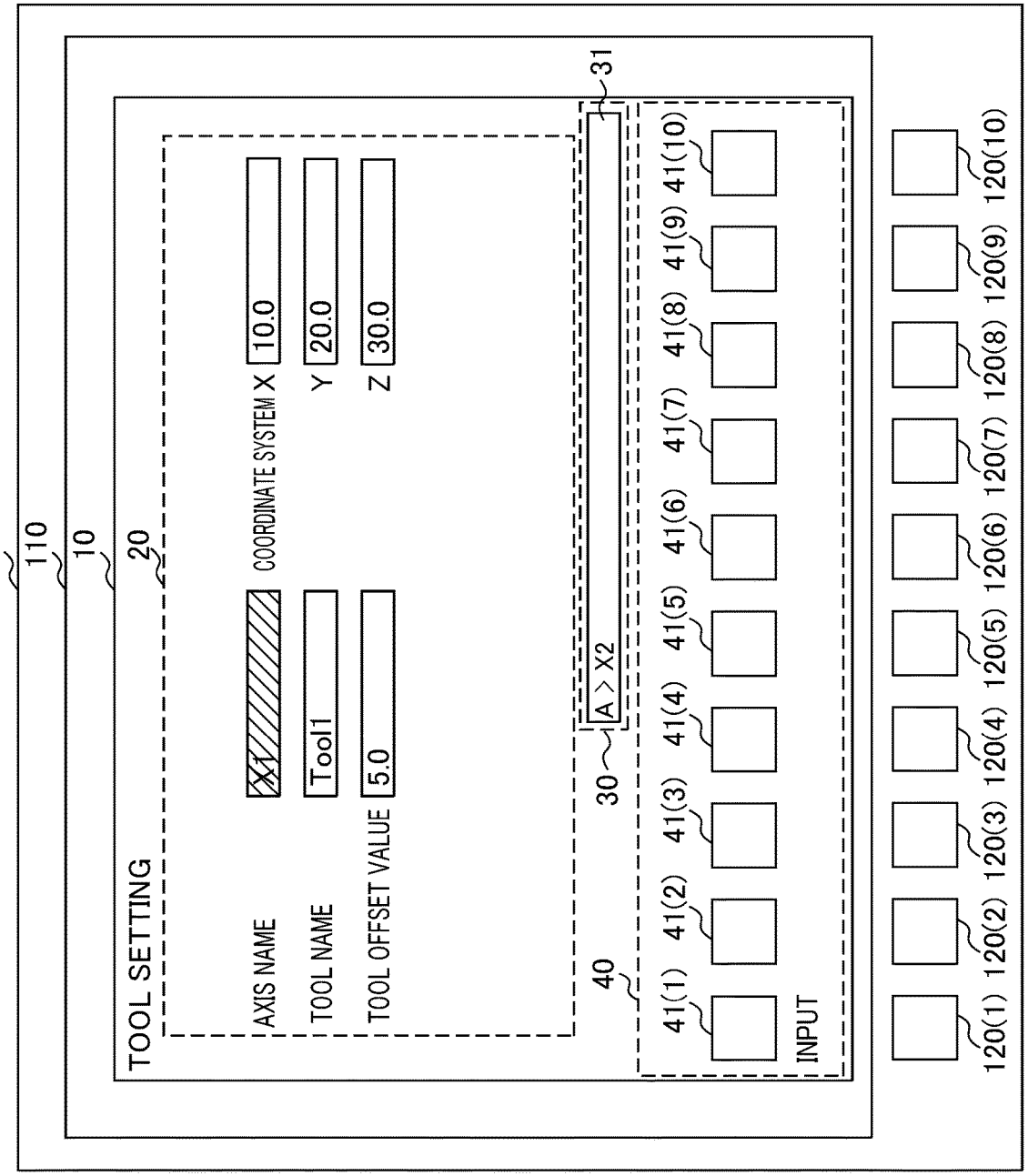

As illustrated in FIG. 7, for example, such a display device 100 of the control system 1 may have a display unit 110 such as a liquid crystal display for displaying the display screen 10 and hard keys 120(1) to 120(10) disposed below the display unit 110 so as to correspond to the soft keys 41(1) to 41(10) to select the soft keys 41(1) to 41(n). The display screen 10 of FIG. 7 illustrates the same display screen as in FIG. 5.

For example, in this case, when the user presses the hard key 120(1), the corresponding soft key 41(1) is selected, and the control devices 200 and 200A can execute an operation of "input" allocated to the selected soft key 41(1).

The functions included in the control devices 200 and 200A according to the first and second embodiments can be realized by hardware, software or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be supplied to a computer via various types of transitory computer readable media. Examples of the transitory computer readable media include electric signals, optical signals and electromagnetic waves. A transitory computer readable medium can provide programs to a computer through a wired communication path such as an electrical cable, optical fiber, or the like or a wireless communication path.

A step of describing the programs to be recorded on the recording medium includes processing that is performed in a parallel or an independent manner although the processing is not necessarily performed in a time series manner as well as processing that is performed in a time series manner according to the order.

In other words, the control device and the control method according to the present disclosure may employ various embodiments having the following configurations.

(1) A control device 200 of the present disclosure is a control device that controls display of a display device 100 for displaying a display screen 10 for setting operations of the control device that controls an industrial machine and soft keys 41 for operating the display screen 10, including: a key input processing unit 210 that receives input from an input device 300; an input content determining unit 220 that determines a content of the input received by the key input processing unit 210; a storage unit 230 that stores a soft key definition information table 231 in which operation contents on the display screen 10 to be allocated to the soft keys 41 are defined in advance depending on the input content; a soft key allocation selecting unit 240 that selects the operation contents to be allocated to the soft keys 41 on the basis of a determination result of the input content determining unit 220 and the soft key definition information table 231; and a soft key display processing unit 250 that displays the soft keys 41 allocated with the operation contents selected by the soft key allocation selecting unit 240 on the display device 100.

According to the control device 200, it is possible to display only the soft keys 41 of necessary operations depending on the input content input to the key input display portion 31.

(2) The control device may further include: an operation target determining unit 260 that determines an operation target of the display screen 10 on the basis of an input item on the display screen 10; and an operation target suitability determining unit 270 that determines suitability of the input content on the basis of the determination result of the operation target determining unit 260, and when the operation target suitability determining unit 270 determines that the input content is suitable, the soft key allocation selecting unit 240a may select the operation content to be allocated to the soft keys 41 on the basis of the soft key definition information table 231 and may cause the soft key display processing unit 250a to display the soft keys 41 allocated with the selected operation content on the display device 100.

By doing so, it is possible to display only the soft keys 41 of necessary operations depending on the operation target and the input content input to the key input display portion 31.

(3) When the operation target suitability determining unit 270 determines that the input content is not suitable, the soft key allocation selecting unit 240a may cause the soft key display processing unit 250a not to display or gray out the soft keys 41 allocated with the selected operation content.

By doing so, the user can perform operations immediately and prevent operation errors.

(4) A control method of the present disclosure is a control method for controlling display of a display device 100 that displays a display screen 10 for setting operations of a control device 200 that controls an industrial machine and soft keys 41 for operating the display screen 10, the method being realized by a computer and including: a key input processing step of receiving input from an input device 300; an input content determining step of determining a content of the input received in the key input processing step; a soft key allocation selecting step of selecting operation contents to be allocated to the soft keys 41 on the basis of a determination result in the input content determining step and a soft key definition information table 231 in which the operation contents on the display screen 10 to be allocated to the soft keys 41 are defined in advance depending on the input content; and a soft key display processing step of displaying the soft keys 41 allocated with the operation contents selected in the soft key allocation selecting step on the display device 100.

According to the control method, the same advantages as in (1) are obtained.

(5) The control method may further include: an operation target determining step of determining an operation target of the display screen 10 on the basis of an input item on the display screen 10; and an operation target suitability determining step of determining suitability of the input content on the basis of the determination result in the operation target determining step, and when it is determined in the operation target suitability determining step that the input content is suitable, the soft key allocation selecting step may involve selecting the operation content to be allocated to the soft keys 41 on the basis of the soft key definition information table 231 and causing the soft keys 41 allocated with the selected operation content to be displayed on the display device 100 in the soft key display processing step.

By doing so, the same advantages as in (2) are obtained.

(6) When it is determined in the operation target suitability determining step that the input content is not suitable, the soft key allocation selecting step may involve causing the soft keys 41 allocated with the selected operation content to be not displayed or be grayed out in the soft key display processing step.

By doing so, the same advantages as in (3) are obtained.

EXPLANATION OF REFERENCE NUMERALS

31: Key input display portion
41(1) to 41(10): Soft key
100: Display device
200, 200A: Control device
210: Key input processing unit
220: Input content determining unit
231: Soft key definition information table
240, 240a: Soft key allocation selecting unit
250, 250a: Soft key display processing unit
260: Operation target determining unit
270: Operation target suitability determining unit

What is claimed is:

1. A control device that controls display of a display device for displaying a display screen for setting operations of the control device that controls an industrial machine and soft keys for operating the display screen, comprising:
   a processor configured to:
      receive input that has been input to a key input portion of the display screen including at least a tool offset screen from an input device;
      determine a content of the received input;
      store a soft key definition information table in which operation contents on the display screen to be allocated to the soft keys are defined in advance depending on the input content;
      select the operation contents to be allocated to the soft keys on the basis of a determination result of the content of the received input and the soft key definition information table; and
      (i) when the input has been received and the operation contents have been selected, display the soft keys allocated with the selected operation contents on the display device, and (ii) when no input has been received, display the soft keys allocated with screen transition operation contents on the display device.

2. The control device according to claim 1, wherein the processor is further configured to:

determine an operation target of the display screen on the basis of an input item on the display screen;

determine suitability of the input content on the basis of the determination result of the operation target of the display screen; and when it is determined that the input content is suitable, select the operation contents to be allocated to the soft keys on the basis of the soft key definition information table display the soft keys allocated with the selected operation contents on the display device.

3. The control device according to claim 2, wherein the processor is further configured to, when it is determined that the input content is not suitable, not display or gray out the soft keys allocated with the selected operation content.

4. A control method for controlling display of a display device that displays a display screen for setting operations of a control device that controls an industrial machine and soft keys for operating the display screen, the method being realized by a computer and comprising:

a key input processing step of receiving input that has been input to a key input display portion of the display screen including at least a tool offset screen from an input device;

an input content determining step of determining a content of the input received in the key input processing step;

a soft key allocation selecting step of selecting the operation contents to be allocated to the soft keys on the basis of a determination result in the input content determining step and a soft key definition information table in which the operation contents on the display screen to be allocated to the soft keys are defined in advance depending on the input content; and a soft key display processing step of (i) when the input has been received and the operation contents have been selected, displaying the soft keys allocated with the operation contents selected in the soft key allocation selecting step on the display device, and (ii) when no input has been received, displaying the soft keys allocated with screen transition operation contents on the display device.

5. The control method according to claim 4, further comprising: an operation target determining step of determining an operation target of the display screen on the basis of a position of an input item on the display screen; and an operation target suitability determining step of determining suitability of the input content on the basis of the determination result in the operation target determining step, wherein when it is determined in the operation target suitability determining step that the input content is suitable, the soft key allocation selecting step involves selecting the operation contents to be allocated to the soft keys on the basis of the soft key definition information table and causing the soft keys allocated with the selected operation contents to be displayed on the display device in the soft key display processing step.

6. The control method according to claim 5, wherein when it is determined in the operation target suitability determining step that the input content is not suitable, the soft key allocation selecting step involves causing the soft keys allocated with the selected operation content to be not displayed or be grayed out in the soft key display processing step.

* * * * *